P. M. REYNOLDS.
THIRD RAIL CONDUIT SYSTEM.
APPLICATION FILED NOV. 30, 1908.
927,428.
Patented July 6, 1909.
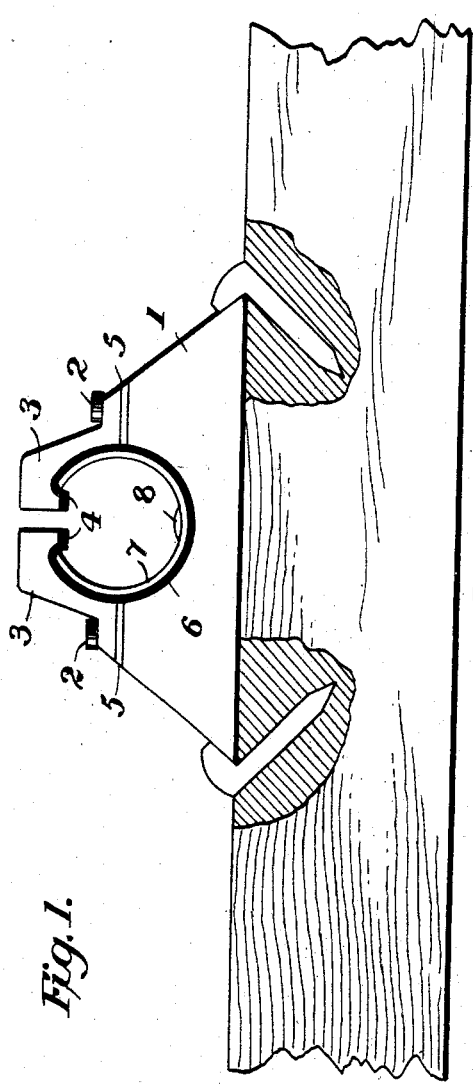
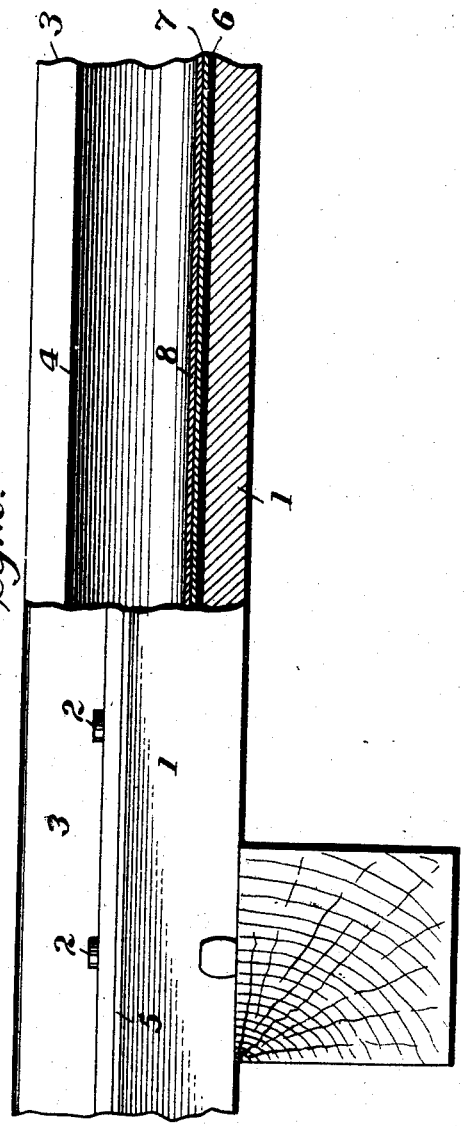
Witnesses
J. G. Hinkel
Charles N. Murray.
Inventor
Philip M. Reynolds
by Eugene E. Brown
Attorney

UNITED STATES PATENT OFFICE.

PHILIP MARION REYNOLDS, OF SAN FRANCISCO, CALIFORNIA.

THIRD-RAIL-CONDUIT SYSTEM.

No. 927,428.            Specification of Letters Patent.           Patented July 6, 1909.

Application filed November 30, 1908. Serial No. 465,179.

*To all whom it may concern:*

Be it known that I, PHILIP MARION REYNOLDS, a citizen of the United States, residing at San Francisco, in the county of San Francisco and State of California, have invented a new and useful Third-Rail-Conduit System, of which the following is a specification in such full and clear terms as will enable those skilled in the art to construct and use the same.

The objects of this invention are to produce a third rail and a conduit system for the distribution of electrical power for street railroad systems which will be applicable to any place where a rail of the ordinary height is used without the construction of the expensive form of conduits, the rail and conduit in this instance being laid directly on the ties which support the car rails, and to provide a rail which will be absolutely free from danger to pedestrians.

Another object of my invention is to produce a conduit in which any current which escapes from the third-rail to the conduit housing or slot-cover by leakage or otherwise, will be immediately short-circuited by reason of the fact that the housing is thoroughly grounded or connected to the opposite pole of the dynamo.

In the drawing which accompanies and forms a part of this application, Figure 1 is an end view of a third rail conduit embodying my invention; and Fig. 2 is a longitudinal view thereof, partly in section.

The numeral 1 is applied to the base portion of the conduit housing, and is provided with a groove or recess in the top for the reception of the third-rail conductor. Slot-rails or cover-portions 3, 3, having the usual depending lips 4, 4, are secured to the base by means of bolts 2. The cover-portions conform interiorly with the recess in the base and combine therewith to form the conduit for the conductor which I have illustrated as substantially circular in cross-section with a contact portion 8, for the engagement of the plows depending from the cars. It will be understood, however, that other forms of conductors may be employed. The conductor is insulated from the conduit housing by means of suitable insulating material 6.

It will be noted that this third-rail construction is of no greater height than the ordinary car rails used in city railways, and that it may be secured on top of the ties 10, of the trackway, thus obviating the expensive form of conduit in which a heavy iron yoke is employed to carry the electrical conductors.

For the purpose of preventing the slot-rails or cover-portions from becoming electrically charged by leakage or accident from the conductor 7, I thoroughly bond the housing to copper or other good conductors 5, 5, which may be secured between the cover and base portions of the conduit housing as shown, and extend longitudinally throughout the third rail construction. By means of this construction the conduit housing may be directly and thoroughly connected to the generator and any current which may escape from the conductor 7, will be absolutely short-circuited or grounded. A charged slot-rail is thus an impossibility and my construction is rendered absolutely free from danger to pedestrians.

It will be evident to electrical engineers and others skilled in the art, that the form of the housing may be changed and other changes may be made without departing from the spirit of my invention.

Having now described my invention and the manner in which it may be used, I claim—

A conduit for electric railways, comprising a housing for the electric conductor or conductors, having a plurality of sections, and a conductor extending longitudinally of the housing and embedded therein and providing a continuous electrical connection.

In testimony whereof I have set my hand this 24th day of November A. D. 1908, in the presence of the two subscribed witnesses.

PHILIP MARION REYNOLDS.

Witnesses:
     C. P. GRIFFIN,
     W. T. HESS.